US008547208B2

(12) United States Patent
Chuang et al.

(10) Patent No.: US 8,547,208 B2
(45) Date of Patent: Oct. 1, 2013

(54) ELECTRONIC DEVICE WITH REMOTE CONTROL FUNCTION

(75) Inventors: Ping-Yang Chuang, Taipei Hsien (TW); Ying-Chuan Yu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 422 days.

(21) Appl. No.: 12/958,260

(22) Filed: Dec. 1, 2010

(65) Prior Publication Data

US 2012/0025958 A1 Feb. 2, 2012

(30) Foreign Application Priority Data

Jul. 29, 2010 (TW) .................................. 99125208

(51) Int. Cl.

*G05B 11/01* (2006.01)
*G05B 19/00* (2006.01)
*B60R 25/10* (2013.01)
*H04N 5/44* (2011.01)
*H01H 47/22* (2006.01)

(52) U.S. Cl.

USPC .................. 340/12.22; 340/5.61; 340/426.36; 340/10.2; 340/517; 348/734; 704/E15.045; 704/275; 704/E21.019

(58) Field of Classification Search

USPC ....................................................... 340/12.22
See application file for complete search history.

(56) References Cited

U.S. PATENT DOCUMENTS

| | | | | |
|---|---|---|---|---|
| 6,751,594 | B1 * | 6/2004 | Diehl et al. | 704/275 |
| 2004/0203697 | A1 * | 10/2004 | Finn | 455/420 |
| 2006/0252457 | A1 * | 11/2006 | Schrager | 455/556.1 |
| 2009/0212905 | A1 * | 8/2009 | Batz et al. | 340/5.54 |
| 2010/0027463 | A1 * | 2/2010 | Burge et al. | 370/328 |
| 2011/0316664 | A1 * | 12/2011 | Olcott et al. | 340/4.37 |

* cited by examiner

*Primary Examiner* — Jennifer Mehmood
*Assistant Examiner* — Fekadeselassie Girma
(74) *Attorney, Agent, or Firm* — Altis & Wispro Law Group, Inc.

(57) ABSTRACT

An electronic device includes a storage unit, a sound signal receiving unit, a remote signal generating unit, a processing unit, and a transmitting unit. The control table records RC devices, sound parameters, and control commands. Each RC device is associated with at least one sound parameter. Each sound parameter corresponds to one control command. The sound signal receiving unit receives sound signals. The processing unit determines a sound parameter according to the received sound signals, searches in the control table to determine the control command the sound parameter corresponding to according to a selected RC device, and controls the remote signal generating unit to generate a remote signal corresponding to the determined control command. The transmitting unit transmits the remote signal to the selected RC device.

3 Claims, 2 Drawing Sheets

ELECTRONIC DEVICE WITH REMOTE CONTROL FUNCTION

BACKGROUND

1. Technical Field

The present disclosure relates to electronic devices and, particularly, to an electronic device with a sound controlled function to remotely control another device.

2. Description of Related Art

Remote controllers, such as those for TVs, of today are often complex and have many buttons for user operation. Theses complex remote controllers are difficult to operate in a dark environment.

BRIEF DESCRIPTION OF THE DRAWINGS

The components of the drawings are not necessarily drawn to scale, the emphasis instead being placed upon clearly illustrating the principles of an electronic device with remote control function. Moreover, in the drawings, like reference numerals designate corresponding parts throughout several views.

DETAILED DESCRIPTION

Figure 1:
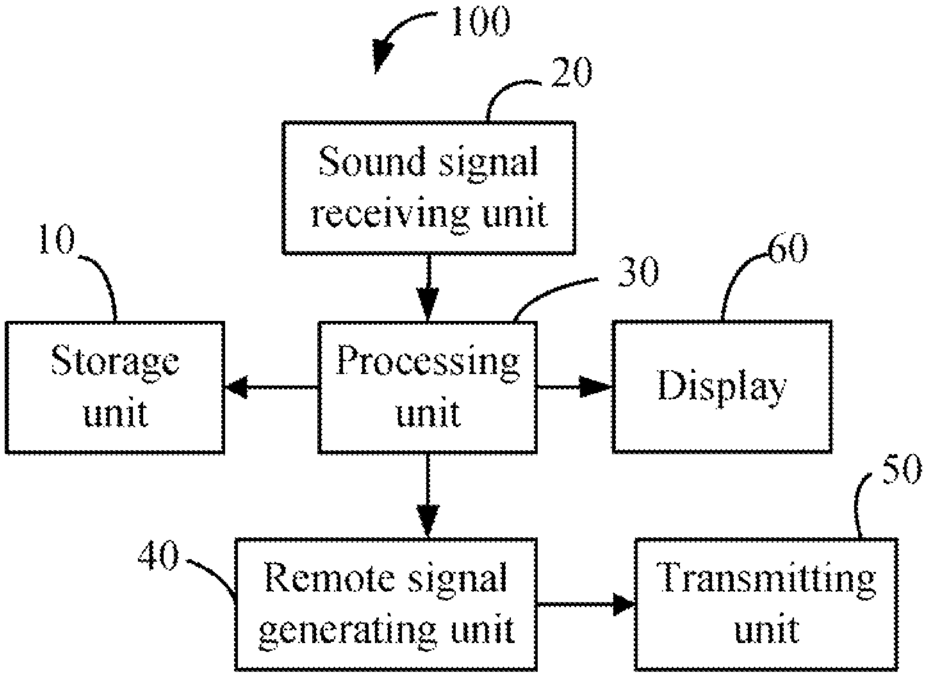
FIG. 1 is a block diagram of an electronic device with remote control function in accordance with an exemplary embodiment.

Referring to FIG. 1, an embodiment of an electronic device 100 is illustrated. The electronic device 100 may be a wearable device or a handheld device, such as, a wristwatch, or a mobile phone. The electronic device 100 can remotely control peripheral devices (not shown), such as a TV, or a video player, and specific control functions can be selected by use of audible signals initiated by a user.

The electronic device 100 includes a storage unit 10, a sound signal receiving unit 20, a processing unit 30, a remote signal generating unit 40, a transmitting unit 50, and a display 60.

Figure 2:
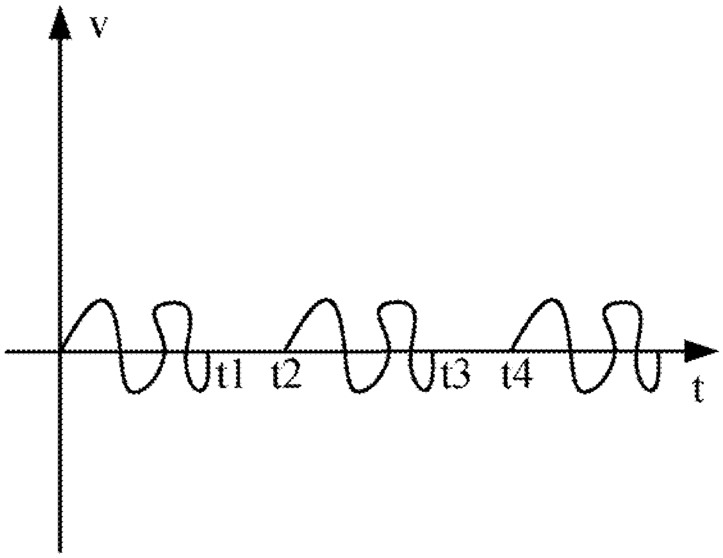
FIG. 2 is a schematic view showing waveforms received by the electronic device of FIG. 1.

The storage unit 10 stores a control table (shown below). The control table records a number of remote controlled devices (hereinafter, RC devices), a number of sound parameters, and a number of control commands. The sound can be generated by a user performing some simple actions such as clapping user's hands, or tapping on a contact surface. In this embodiment, each sound parameter is the number of waveforms of sound signals received within a predetermined time interval. In an alternative embodiment, each sound parameter is consisted of duration of each interval between adjacent waveforms of sound signals received within the predetermined time interval. For example, as shown in FIG. 2, three waveforms are received within the predetermined time interval, the duration of the interval between the first received waveform and the second waveform is (t2-t1), and the duration of the interval between the second waveform and the third waveform is (t4-t3), thus the sound parameter of the received sound signals is (t2-t1, t4-t3). In another alternative embodiment, each sound parameter is consisted of the number of waveforms and duration of each interval between adjacent waveforms of sound signals received within the predetermined time interval. Each RC device is associated with at least one of the sound parameters. Each sound parameter corresponds to one control command. The same sound parameters associated with different RC devices may correspond to different control commands. As shown below, the first sound parameter associated with the RC device A corresponds to the first control command, and the first sound parameter associated with the RC device B corresponds to the third control command different from the first control command. That is, if the electronic device 100 is employed to control the RC device A, the first sound parameter of the electronic device 100 controls the RC device A to execute a function. If the electronic device 100 is employed to control the RC device B, the first sound parameter of the electronic device 100 controls the RC device B to execute another function.

CONTROL TABLE

| RC Device | Sound Parameter | Control Command |
|---|---|---|
| A | First Sound Parameter | First Control Command |
| | Second Sound Parameter | Second Control Command |
| B | First Sound Parameter | Third Control Command |
| . . . | . . . | . . . |

The sound signal receiving unit 20 receives sound signals. In this embodiment, the sound signal receiving unit 20 is a microphone.

The processing unit 30 determines a sound parameter according to the sound signals received by the sound signal receiving unit 20 within the predetermined time interval. In this embodiment, the processing unit 30 determines that the number of waveforms of sound signals received within the predetermined time interval is a needed sound parameter. In an alternative embodiment, the processing unit 30 may determine that duration of each interval between adjacent waveforms of sound signals received within the predetermined time interval is a needed sound parameter, or determine that a combination of the number of waveforms and duration of each interval between adjacent waveforms of sound signals received within the predetermined time interval is a needed sound parameter. The processing unit 30 displays a user interface (not shown) on the display 60 for users to select a RC device. The processing unit 30 further determines which RC device is selected, search in the control table to determine the control command the determined sound parameter corresponding to according to the determined sound parameter and the selected RC device, and control the remote signal generating unit 40 to generate a remote signal corresponding to the determined control command. The transmitting unit 50 transmits the remote signal to the selected RC device to control the selected RC device to execute a predetermined function.

With such configuration, if a user performs an action according to a predetermined way, the electronic device 100 can conveniently control a selected RC device.

For better understanding the present disclosure, an example is given to illustrate the present disclosure. In this example, the electronic device 100 is a wristwatch on the wrist of a user, and the selected RC device is a TV. One waveform received within the predetermined time interval is predetermined to turn on the TV, and two waveforms received within the predetermined time interval is predetermined to turn off the TV. When the user performs an action for example claps hands once within the predetermined time interval, the sound signal receiving unit 20 receives one sound waveform within the predetermined time interval. The processing unit 30 determines that the electronic device 100 is employed to turn on the TV, and controls the remote signal generating unit 40 to generate the remote signal for turning on the TV. The transmitting unit 50 then transmits the remote signal to turn on the TV. When the user claps hands twice within the predetermined time interval, the sound signal receiving unit 20 receives two sound waveforms within the predetermined time interval. The processing unit 30 determines that the electronic device 100 is employed to turn off the TV according to the control table and the determined times, and controls the remote signal generating unit 40 to generate the remote signal for turning off the TV. The transmitting unit 50 then transmits the remote signal to turn off the TV.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with remote control function, comprising:

- a storage unit storing a control table, the control table recording a relationship between at least one remote controlled device, at least one sound parameter, and at least one control command, each of the at least one remote controlled device being associated with at least one of the at least one sound parameter, and each of the at least one sound parameter corresponding to one of the at least one control command, each of the at least one sound parameter being selected from the group consisting of the number of waveforms of sound signals received within a predetermined time interval, duration of each interval between adjacent waveforms of sound signals received within a predetermined time interval, and a combination of the number of waveforms and duration of each interval between adjacent waveforms of the sound signals received within the predetermined time interval;
- a sound signal receiving unit to receive sound signals;
- a remote signal generating unit;
- a processing unit to determine a sound parameter according to the sound signals received by the sound signal receiving unit within the predetermined time interval, determine which of the at least one remote controlled device is selected, and search in the control table to determine the control command the determined sound parameter corresponding to according to the determined sound parameter and the selected remote controlled device, and further control the remote signal generating unit to generate a remote signal corresponding to the determined control command; and
- a transmitting unit to transmit the remote signal to the selected remote controlled device.

2. The electronic device as described in claim 1, wherein the processing unit is further to provide a user interface for users to select one of the at least one remote controlled device.

3. The electronic device as described in claim 1, wherein the electronic device is a wristwatch.

* * * * *